United States Patent [19]
Brown, Jr. et al.

[11] 3,898,509
[45] Aug. 5, 1975

[54] CATHODE-RAY TUBE HAVING LITHIUM SILICATE GLARE-REDUCING COATING WITH REDUCED LIGHT TRANSMISSION AND METHOD OF FABRICATION

[75] Inventors: Malcolm George Brown, Jr., Lancaster; Donald Walter Bartch, Columbia, both of Pa.

[73] Assignee: RCA Corporation, New York, N.Y.

[22] Filed: Sept. 28, 1970

[21] Appl. No.: 76,032

[52] U.S. Cl............ 313/478; 117/33.3; 117/33.5 C; 117/37 R; 117/54; 117/94; 117/119.6; 117/124 A; 156/99; 220/2.1 A; 252/313 S
[51] Int. Cl.......................... H01j 31/26; B44d 5/02
[58] Field of Search... 117/54, 37 R, 124 A, 33.5 C, 117/94, 33.3, 119.6; 252/313 S; 313/65 R, 65 T, 364, 478; 220/2.1 A; 156/99

[56] References Cited
UNITED STATES PATENTS

| | | | |
|---|---|---|---|
| 2,428,357 | 10/1947 | Cohen | 117/124 A |
| 2,689,804 | 9/1954 | Sadowsky | 117/124 A |
| 2,836,754 | 5/1958 | Holborn et al. | 117/33.5 C |
| 2,883,307 | 4/1959 | Orr | 117/124 A |
| 2,951,773 | 9/1960 | Helle et al. | 117/124 A |
| 3,301,701 | 1/1967 | Baker et al. | 117/124 A |
| 3,326,715 | 6/1967 | Twells | 117/124 A |
| 3,505,051 | 4/1970 | Buckley et al. | 117/124 A |
| 3,552,992 | 1/1971 | Self et al. | 117/124 A |
| 3,635,751 | 1/1972 | Long | 117/94 |

*Primary Examiner*—Michael F. Esposito
*Attorney, Agent, or Firm*—G. H. Bruestle; L. Greenspan

[57] ABSTRACT

A cathode-ray tube including, on its viewing surface, a glare-reducing coating composed of a lithium silicate material and carbon particles. The novel method comprises: (a) warming the surface of a glass support to about 30° to 100°C, (b) coating the warm surface with an aqueous solution containing about 1 to 10 weight percent of a lithium-stabilized silica sol and a sufficient proportion of carbon particles to produce the desired reduction in light transmission, (c) drying the coating, and then (d) heating the dry coating at about 150°C to 300°C.

8 Claims, 3 Drawing Figures

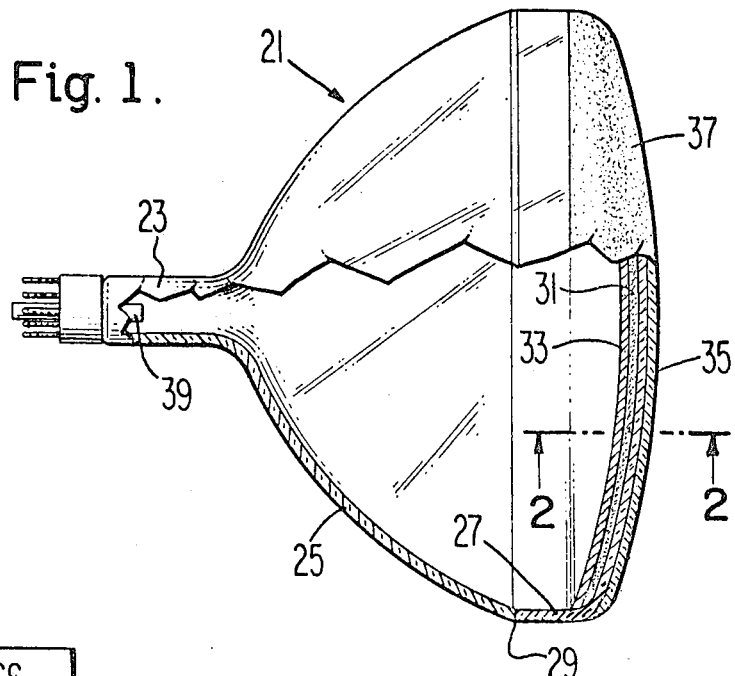

Fig. 1.

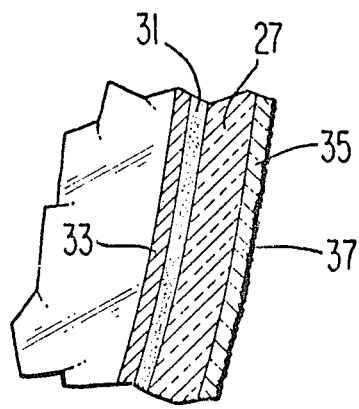

Fig. 2.

```
┌─────────────────────────┐
│ WARM SURFACE OF GLASS   │
│ SUPPORT TO 30° TO 100°C.│
└───────────┬─────────────┘
            ▼
┌─────────────────────────┐
│ COAT WARM SUPPORT SURFACE│
│ WITH LITHIUM-STABILIZED │
│ SILICA SOL AND          │
│ CARBON PARTICLES        │
└───────────┬─────────────┘
            ▼
┌─────────────────────────┐
│ DRY COATING             │
└───────────┬─────────────┘
            ▼
┌─────────────────────────┐
│ HEAT DRY COATING AT     │
│ 150° TO 300°C. FOR      │
│ 10 TO 60 MINUTES        │
└─────────────────────────┘
```

Fig. 3.

CATHODE-RAY TUBE HAVING LITHIUM SILICATE GLARE-REDUCING COATING WITH REDUCED LIGHT TRANSMISSION AND METHOD OF FABRICATION

BACKGROUND OF THE INVENTION

This invention relates to a novel cathode-ray tube having a glare-reducing coating on its viewing surface and to a novel method for making this glare-reducing coating.

Specular reflection or glare is the direct reflection of ambient light from a smooth glass surface. Glare of light from ambient light sources interferes with the viewing of images behind the glass surface and is therefore objectionable to the viewer. In the case of a television tube, the glare of light from lamps and other light sources near the tube, especially the image of these light sources may interfere with the viewing of the picture on the tube face.

The term "glare-reducing" as used herein is the reduction in brightness and resolution of the reflected image of an ambient light source. Ideally, the reflected image is dissipated without affecting the rest of the viewing area of the television tube. For example, an ambient light source, such as an electric light bulb, produces a bright reflected image of the source on the face of the tube at the viewing angle of the source. A glare-reducing coating reduces the brightness and/or the resolution of this reflected image.

It has been suggested previously that glare may be reduced when the glass surface is coated with an alkali silicate material. See, for example, U.S. Pat. Nos. 3,114,668 to G. A. Guiles and 3,326,715 to R. G. Twells. Such coatings do not depend on destructive interference of the ambient light because of the critical thickness of the coating. Instead, the surfaces of these coatings have a controlled roughness so that the ambient light is scattered. This roughness should not unduly degrade the resolution of the image to be viewed. Also, at least for practical use on television picture tubes, the glare-reducing coating should be adherent to the glass surface and be adequately hard, abrasion resistant, and be chemically stable to moisture and humidity.

For some cathode ray tubes, it is now desirable to provide glare-reducing coatings with the foregoing characteristics and, in addition, predetermined reductions in light transmission with neutral density. Furthermore, it is desirable that such coatings be capable of being applied directly to the viewing surface after the tubes have been completely fabricated.

SUMMARY OF THE INVENTION

The novel cathode ray tube includes, on its viewing surface, a coating having a rough glare-reducing surface. The coating, prepared by the novel method, consists essentially of a lithium silicate material and carbon particles in proportions sufficient to reduce the light transmission through the coating by a predetermined amount, preferably about 10 to 50 percent. The novel method includes the steps of:

a. warming the surface of a glass support to about 30° to 100°C, b. coating the warm surface with an aqueous solution containing about 1 to 10 weight percent of a lithium-stabilized silica sol, the sol having an $SiO_2:Li_2O$ ratio of about 4:1 to 25:1, and 0.5 to 6.0 weight percent of the weight of said sol of carbon particles, c. drying the coating, d. heating the dry coating at about 150°C to 300°C for about 10 to 60 minutes, e. and incorporating said glass support into a cathode ray tube.

By using the combination of a lithium-stabilized silica sol and carbon particles in the foregoing method, it is now feasible to prepare a neutral density lithium silicate glare-reducing coating for a glass surface having a predetermined reduced light transmission. The coating, when applied to the viewing surface of a television tube, provides satisfactory glare reduction and transmission reduction without unduly interfering with the color or resolution of the television picture. The coating is hard, abrasion resistant, adherent to glass surfaces, and chemically stable to moisture and humidity. The coating may be made on a separate glass support which is then adhered to the faceplate of a completed tube. Or, the coating may be made directly on the external viewing surface of the tube after the tube has been completely fabricated because of the relatively low processing temperatures required. In fact, processing temperatures above 300°C, which are required for preparing prior silica, potassium silicate and sodium silicate glare-reducing coatings, adversely affect the carbon particles and light transmission of the coating and therefore should be avoided.

BRIEF DESCRIPTION OF THE DRAWING

FIG. 1 is a partially-broken away longitudinal view of a cathode ray tube including the novel viewing screen of the invention.

FIG. 2 is an enlarged sectional view through a fragment of the faceplate of the tube illustrated in FIG. 1 along section lines 2—2.

FIG. 3 is a flow chart diagram of the novel process of the invention.

DESCRIPTION OF THE PREFERRED EMBODIMENTS

The cathode ray tube illustrated in FIG. 1 includes an evacuated envelope, designated generally by the numeral 21, which includes a neck section 23 integral with a funnel section 25 and a faceplate or panel 27 joined to the funnel section 25 by a seal 29, preferably of a devitrified glass. A luminescent coating 31 of a phosphor material is applied to the interior surface of the faceplate 27. A light-reflecting metal coating 33, as of aluminum, is applied to the luminescent coating 31 as shown in detail in FIG. 2. The luminescent coating 31, when being suitably scanned by an electron beam from a gun 39, is capable of producing a luminescent image which may be viewed through the faceplate 27. A glare-reducing coating 35 having a rough external surface 37 and consisting essentially of a lithium silicate material and carbon particles is applied to the external surface of the faceplate 27. Inasmuch as the invention is concerned primarily with the faceplate 27 and the coatings thereon, a description of the electron-emitting components and other parts normally associated with the neck and funnel portions 23 and 25 is omitted or shown schematically.

The glare-reducing coating 35 may be produced by the process shown in the flow sheet of FIG. 3. The faceplate 27 may be part of a tube which has already been evacuated and sealed off at the time the glare-reducing coating is produced. One advantage of the novel coating and method is that it may be produced after the tube has been otherwise completely fabricated. Alternatively, the glass plate may be an implosion protection plate which is to be adhered to the external surface of the faceplate 27 by a suitable adhesive, or a faceplate during tube fabrication.

By the novel process, a clean glass support, such as the faceplate 27 of an evacuated and sealed tube 21, is warmed to about 30°C to 100°C as in an oven. The external surface of the warm faceplate is coated with a dilute aqueous solution of a lithium-stabilized silica sol and carbon particles. The coating may be applied in one or several layers by any conventional process, such as by spraying. The temperature of the faceplate, the specific technique for applying the coating and the number of layers applied are chosen empirically to produce a coating with the desired thickness. The temperature of the faceplate is preferably about 35° to 55°C. Temperatures that are too low (e.g. 20°C) cause the coating to bead, while temperatures that are too high produce coatings which give a dry appearance. It has been found that, when applying the coating by spraying, the coating thickness should be such as to permit the operator to resolve the three bulbs of the reflection of a three-bulb fluorescent light fixture located about 6 feet above the glass support. A thicker initial coating results in a thicker final coating. Generally, the thicker the coating, the greater the reduction in glare and the greater the loss in resolution of the luminescent image. Conversely, the thinner the coating, the lesser the reduction in glare and the lesser the loss in resolution of the luminescent image.

Also when applied by spraying, the coating takes on an appearance of dryness. Greater dryness is achieved (1) by using higher panel temperatures while applying the coating, (2) by using more air in the spray when spraying with compressed air, (3) by using a greater spraying distance when spraying on the coating, and (4) by increasing the mole ratio of $SiO_2/Li_2O$. But, when this is overdone, the coating crazes. The greater the appearance of dryness, the greater the glare reduction and the greater the loss in resolution of the luminescent image. Conversely, the lesser the appearance of dryness, the lesser the glare reduction and the lesser the loss in resolution of the luminescent image.

The coating composition is an aqueous lithium-stabilized silica sol containing about 1 to 10 weight percent solids and 0.5 to 6.0 weight percent (with respect to the weight of the solids in the sol) of carbon particles. In the sol, the ratio of $SiO_2$ to $Li_2O$ is from about 4:1 to about 25:1. The silica sol is substantially free of alkali metal ions other than lithium and is substantially free of anions other than hydroxyl. The lithium-stabilized silica sol differs substantially from a lithium silicate solution, which is a compound dissolved in a solvent and not a sol.

A stabilized sol useful in the novel method may be prepared beginning with a silica sol of conventional character. Such sols may contain particles having an average particle diameter of between about 1 and 150 millimicrons but preferably in the range of 5 to 25 millimicrons. The sol is then treated to remove substantially all alkali metal cations and all anions other than hydroxyl anions. Such removal may be achieved using ion exchange resins or by dialysis. Then, lithium hydroxide is added to the silica sol and permitted to stand overnight. A precipitate which first forms redissolves and produces a lithium-stabilized silica sol. The sols useful in the novel method should be substantially free of alkali metal cations other than lithium. It is believed that other alkali metal ions when present will displace lithium in relation to the silica particles producing essentially different results. The presence of small amounts of other alkali metal ions reduces the adherence of the coating to glass. Also, the sols used in the novel method should be essentially free of anions other than hydroxyls. Any substantial amount of sulfates, chlorides, or the like tends to produce a product of lesser stability. Some sols which may be used in the novel method are described in U.S. Pat. No. 2,668,149 issued Feb. 2, 1954 to R. K. Iler. Another suitable lithium silicate composition is described in U.S. Pat. No. 3,459,500 to M. A. Segura et al.

The carbon particles are preferably selected from a class known as carbon blacks or lamp blacks, although other carbons, such as graphite, may be used. Some useful commercial carbons are Carbolac No. 1 marketed by Cabot Corp., Boston, Mass., and Aqua Black marketed by Columbian Carbon Corp., New York, N.Y. The carbon has a small average particle size (about 5 to 100 millimicrons) and is thoroughly and evenly dispersed in the coating composition. A convenient way of introducing the carbon particles is to add a known proportion of liquid india or indian ink to the lithium silicate composition. Indian ink is described in "Thorpe's Dictionary of Applied Chemistry," Longmans Green and Co., New York, 1943.

After coating the warm glass support, the coating is dried in air with care to avoid the deposition of lint or other foreign particles on the coating. Finally, the dry coating is heated at between 150°C and 300°C for 10 to 60 minutes. Baking at temperatures between about 150°C and 300°C permits the coating to be applied directly to the tube face after the tube has been exhausted and sealed. Baking at temperatures above 300°C would probably disturb fabricated structures in the tube. In addition, baking in air above 300°C, as is required for preparing prior silica, potassium silicate, and sodium silicate glare-reducing coatings, causes more or less increases in light transmission through the coating. This is believed to be caused by oxidation of the carbon. The optimum conditions of time and temperature are determined empirically. Generally, the higher the heating temperature, the lower will be the glare reduction in the product and the higher will be the abrasion resistance. The coating may be recycled through the heating step. Recycling at a particular temperature has the effect of reaching a stable point.

The product of the novel method is a cathode ray tube having a novel glare-reducing coating on its viewing surface. The coating has the quality of glare reduction; that is, scattering of reflected light; and at the same time transmits the luminescent image on the phosphor coating with a resolution of at least 500 lines per inch. The glare-reducing coatings are chemically stable to manufacturing processes and to subsequent exposure to humid atmospheres. The coatings resist abrasion, exhibit substantially flat spectral responses to both reflected and transmitted light, and reduce light transmission up to 50 percent of its initial value. The reduced light transmission may be used to increase the contrast of the viewed image with respect to its background. The amount of reduction of light transmission is affected by carbon concentration and thickness of the coating.

EXAMPLE 1

The faceplate of a 25-inch rectangular color-television-picture tube that is exhausted, sealed and based is cleaned to remove dirt, oil, scum, etc. by any of the known scouring and washing procedures. The faceplate has a neutral optical density with about 69 percent light transmission. The assembly is heated at about 40° to 45°C for about 30 minutes. Onto the warm glass surface, spray a coating composition prepared by mixing 167 ml. of a lithium-stabilized silica sol containing about 3 weight percent (5.01 grams) solids, such as Lithium Polysilicate 48, marketed by E. I. du Pont de Nemours and Company, Inc., Wilmington, Del., suitably diluted with water, and 6.5 ml. india ink containing about 4 weight percent (0.26 gram) carbon (A. W. Faber - Castell Higgins Black). The silica sol has a mol ratio of $SiO_2$ to $Li_2O$ of about 4.8. Using a DeVilbis No. 501 spray gun, spray at about 25 psi air pressure a wide fan spray having a high air-to-liquid ratio. Ten to 50 passes of the spray are required to build up the coating to the required thickness. The spray application is stopped about when the greatest thickness at which the reflection from the three bulbs of an ordinary three-bulb fluorescent light fixture spaced about six feet above the panel can still be resolved or distinguished by the operator on the coating. The coating is less than about 0.0001 inch thick. Because of the temperature of the panel, the thickness of the coating, and the high air content of the spray, the coating dries quickly after deposition. The assembly is then baked for about 30 minutes at about 200°C and entails about a 30-minute period to rise to this temperature and about a 30-minute period to cool back to room temperature. The baking develops the final optical and physical properties of the glare-reducing coating. For coatings made in this manner, neither the optical properties of the coating nor the abrasion resistance was degraded when the panel was exposed for 18 hours in a 100°F, 95 percent relative humidity atmosphere. The final coating reduces overall transmission of the faceplate from 69 percent to 42 percent; or the coating effectively reduces the light transmission by about 39 percent.

EXAMPLE 2

The glass surface of the faceplate of a 25-inch rectangular color-television-picture tube that is exhausted and sealed is scrubbed with a commercial scouring compound, such as Bon Ami, rinsed with warm (120°F) deionized water, followed by a swab with a 2 percent ammonium bifluoride solution, and again rinsed with warm (120°F) deionized water. The glass surface is allowed to drip dry, and care is taken to prevent airborne dirt and oils from contaminating the glass surface. After drying the glass surface, the tube is placed in a forced hot air oven and the glass surface is warmed to about 40° - 45°C. The glass surface is then sprayed with a coating composition prepared by mixing 167 ml. of 3 weight percent solution of Lithium Polysilicate 48 (about 5.01 grams total solids) and 3.85 ml. of liquid india ink (about 0.16 gram carbon). The spray is relatively dry being applied from a distance of about 12 inches using an air pressure of about 25 psi. After spraying, the coated glass is heated for about 1 hour at 300°C. The resultant coating has optical and physical properties very similar to the coating produced in Example 1, except that the light transmission of the faceplate is reduced from an initial value of about 69 percent to about 53 percent; or the coating effectively reduces the light transmission by about 23 percent.

EXAMPLE 3

The outer surface of the faceplate of a cathode ray tube is scrubbed with a commercial scouring compound such as Bon Ami, rinsed with (120°F) deionized water, followed by a swabbing with a 2 percent ammonium bifluoride solution and again rinsed with warm (120°F) deionized water. The glass surface is allowed to drip dry, and care is taken to prevent airborne dirt and oils from contaminating the glass surface. After drying, the tube is placed into a forced hot air oven and the glass is warmed to about 70°C. The glass surface is then sprayed with a coating composition prepared by mixing about 167 ml. of a 3 weight percent water solution of a Lithium Polysilicate (about 5.01 grams solids) and about 2.0 ml. of liquid india ink (about 0.08 gram carbon). The spray is relatively dry, being applied from a distance of about 12 inches using an air pressure of 25 psi. After spraying, the tube is heated for about one hour at about 150°C. The resultant coating has optical properties similar to the coating produced in Example 1, except that the light transmission of the faceplate is reduced from an initial value of about 69 to about 61 percent; or, the coating effectively reduces the light transmission by about 12 percent. The coating passes the standard humidity resistance test outlined in Example 1.

We claim:

1. A cathode-ray tube including, on its viewing surface, an image-transmitting, glare-reducing coating having a rough surface and composed of a lithium silicate material and carbon particles, said particles having an average particle size less than about 100 millimicrons and being present in proportions sufficient to reduce the light transmission through said coating by a predetermined amount.

2. The cathode-ray tube defined in claim 1 wherein the presence of said carbon particles reduces said light transmission about 10 to 50 percent.

3. The cathode-ray tube in claim 2 wherein said lithium silicate has an $SiO_2:Li_2O$ ratio of about 4:1 to 25:1.

4. The cathode-ray tube defined in claim 2 comprising an evacuated envelope including a faceplate, a luminescent coating on the inner surface thereof, and means for exciting said luminescent coating, said glare-reducing coating being on the external surface of said faceplate.

5. In a method for preparing an image-transmitting glare-reducing coating on the viewing surface of a cathode ray tube, the steps including
   a. warming a surface of a glass support to about 30°C to 100°C,
   b. coating said surface with an aqueous solution containing about 1 to 10 weight percent of a lithium-stabilized silica sol, said sol having an $SiO_2:Li_2O$ ratio of about 4:1 to 25:1, and 0.5 to 6.0 weight percent of the weight of said sol of carbon particles, having an average particle size less than about 100 millimicrons,
   c. drying said coating, d. heating said dry coating at about 150°C to 300°C for about 10 to 60 minutes, e. and incorporating said glass support into said cathode ray tube.

6. The method defined in claim 5 wherein said glass support is the faceplate of a cathode ray tube and said surface is the external surface thereof.

7. The method defined in claim 5 wherein said cathode-ray tube comprises an evacuated glass envelope including a faceplate and said steps (a) through (d) are carried out directly on the external surface of said faceplate after said cathode ray tube has been evacuated and sealed.

8. The method defined in claim 5 wherein said cathode-ray tube comprises an evacuated glass envelope including a faceplate and said steps (a) through (d) are carried out on the surface of a separate glass support and then the coated glass support is adhered to the external surface of the faceplate of said cathode ray tube.

* * * * *